(No Model.)
W. W. SPEER.
METHOD OF MAKING WHEELS.
No. 505,612. Patented Sept. 26, 1893.
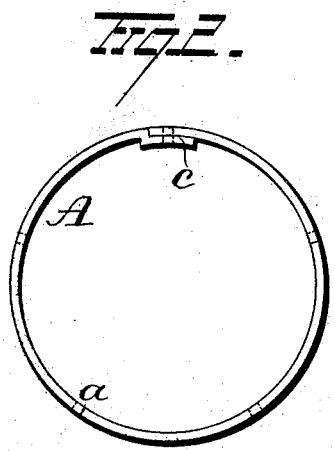
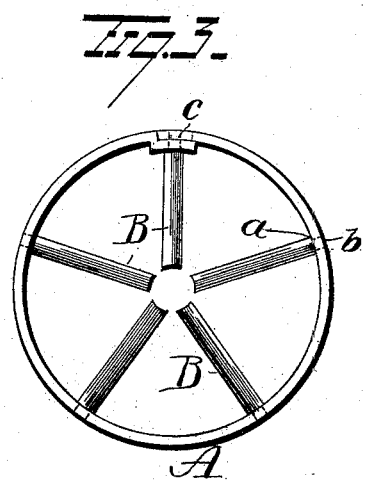
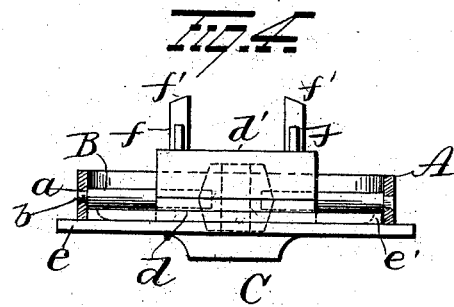
Witnesses
C. Nottingham
G. F. Downing
Inventor
W. W. Speer
By Leggett & Leggett
Attorneys

United States Patent Office.

WILLIAM W. SPEER, OF PITTSBURG, PENNSYLVANIA.

METHOD OF MAKING WHEELS.

SPECIFICATION forming part of Letters Patent No. 505,612, dated September 26, 1893.

Application filed March 15, 1893. Serial No. 466,131. (No specimens.)

*To all whom it may concern:*

Be it known that I, WILLIAM W. SPEER, a resident of Pittsburg, in the county of Allegheny and State of Pennsylvania, have invented certain new and useful Improvements in Methods of Making Wheels; and I do hereby declare the following to be a full, clear, and exact description of the invention, such as will enable others skilled in the art to which it appertains to make and use the same.

My invention relates to an improvement in the method of manufacturing wheels,—the object being to produce a simple and efficient method whereby to produce a wheel having a steel rim, wrought iron spokes and a cast hub.

A further object is to produce a simple and efficient wheel adapted for use on plows, having a steel rim or tire, wrought iron spokes and a cast iron hub.

With these objects in view the invention consists in certain steps in the process of making a wheel and in certain novel features of construction and combinations and arrangements of parts as hereinafter set forth and pointed out in the claim.

In the accompanying drawings: Figure 1 is a view of the rim with seat to form the lap joint. Fig. 2 is a view of the rim bent ready for securing the spokes. Fig. 3 shows the spokes secured to the rim, ready to be put in the chill to cast the hub. Fig. 4 shows the wheel placed in the chill ready to cast the hub.

A represents the steel rim having a series of perforations $a$, for the tenons $b$ of the spokes B, said perforations being made in the rim before it is bent. One end of the rim A is bent to produce a seat $c$, whereby, when the rim is bent, as shown in Fig. 2, a lap joint will be produced. When the rim or tire A shall have been bent as shown in Fig. 2, the tenons $b$ of the spokes B will be inserted into the perforations $a$ and upset or riveted, the tenon of one of said spokes passing through perforations in the seat $c$. The spokes with the rim riveted thereto will next be placed on the lower portion $d$ of the mold or chill C, the edge of the rim A resting on a flange $e$ projecting from the portion $d$ of the mold, and the top portion $d'$ of the mold or chill placed in position. The parts of the mold or chill will be secured together by means of keys $f$ passing through the posts $f'$, and the metal poured in,—after which, the parts of the mold or chill will be separated, the wheel thus completed taken out and another rim and spokes placed in position and the same process repeated. It will be seen that when the rim and spokes are in position for casting the hub, the rim will rest on the flange $e$ of the mold, the outer ends of the spokes will rest on the flange $e'$ of the lower portion of the mold or chill, the inner ends projecting into the space in which the hub is molded, and that at points between their ends, the spokes will be firmly clamped between the parts of the mold or chill, thus retaining them and the rim in proper position and producing a symmetrical wheel.

My improved method is very simple, easy to carry out and results in the production of a simple, cheap and very efficient wheel for plows and other purposes.

Having fully described my invention, what I claim as new, and desire to secure by Letters Patent, is—

The method of producing a wheel consisting in taking a strip of metal, with a series of holes therein, overlapping the holes in the extreme ends, riveting spokes in the holes, and pouring metal in a mold or chill at the inner ends of the spokes to form a hub on the inner ends of the spokes, substantially as set forth.

In testimony whereof I have signed this specification in the presence of two subscribing witnesses.

WILLIAM W. SPEER.

Witnesses:
WILLIAM M. COSGROVE,
THOMAS D. GRAHAM.